Sept. 27, 1960 W. A. SWERTFEGER 2,954,084
APPARATUS FOR UNEARTHING TREE ROOTS
Filed March 10, 1958 2 Sheets-Sheet 1
FIG. 1
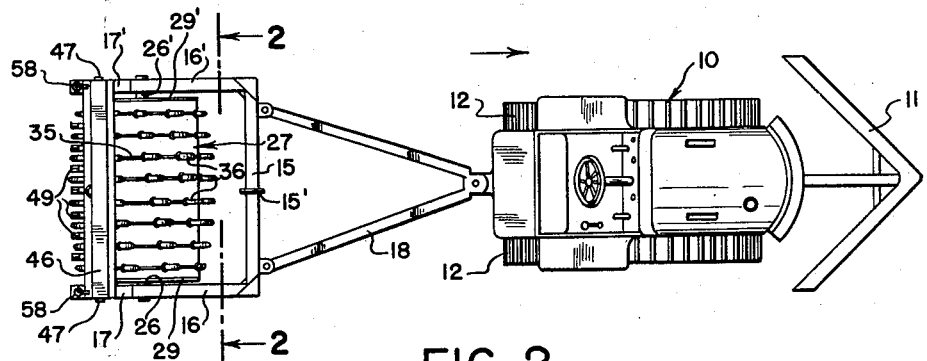
FIG. 2
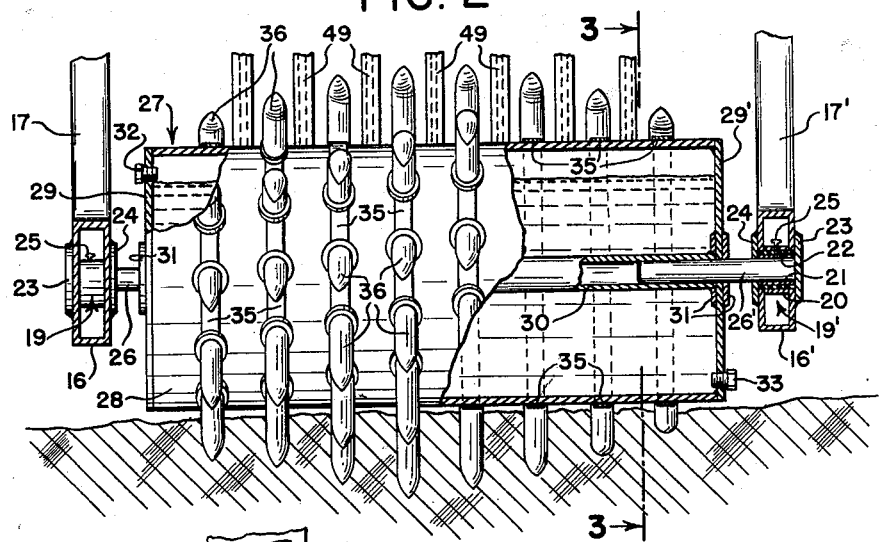
FIG. 3
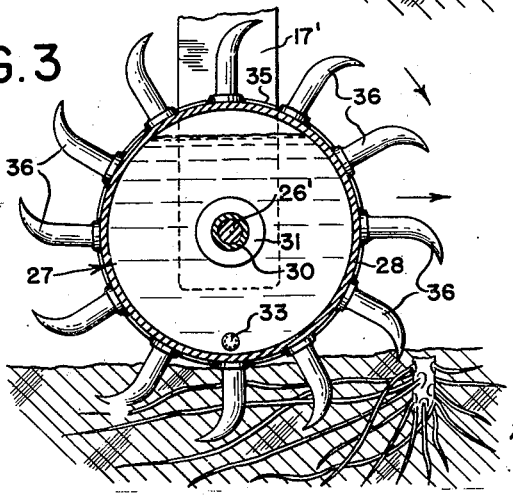
FIG. 4
INVENTOR.
Walter A. Swertfeger
BY
ATTORNEYS Sept. 27, 1960     W. A. SWERTFEGER     2,954,084
APPARATUS FOR UNEARTHING TREE ROOTS
Filed March 10, 1958     2 Sheets-Sheet 2
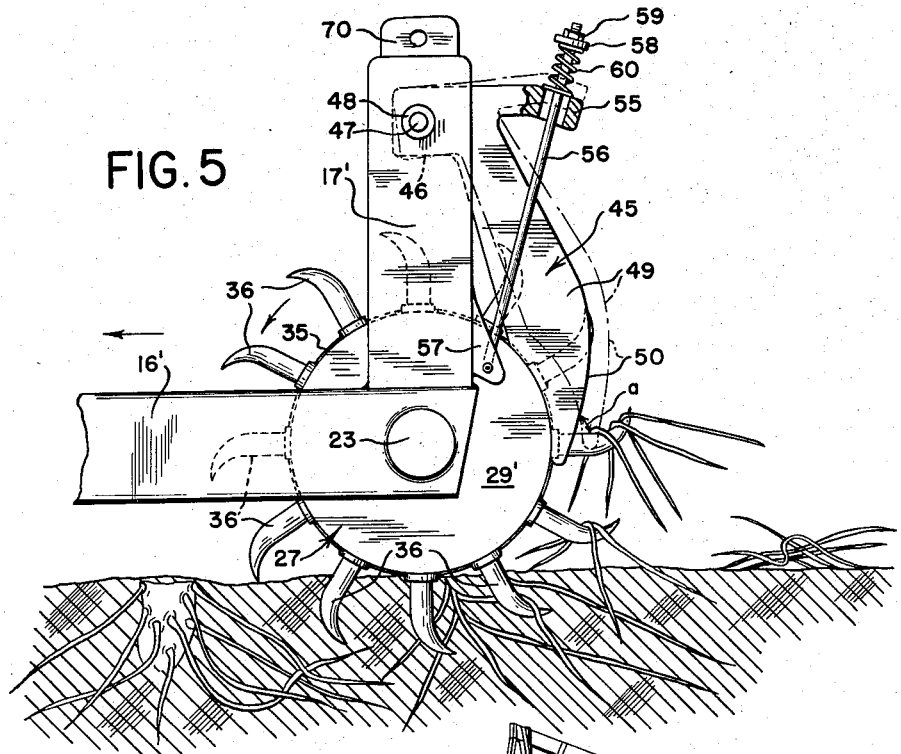
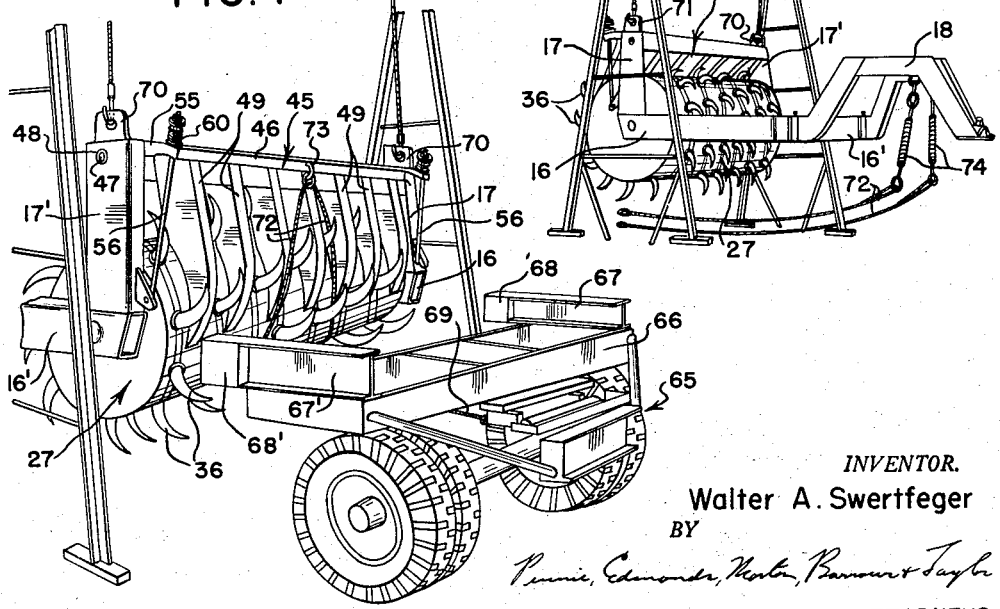
INVENTOR.
Walter A. Swertfeger
BY
ATTORNEYS

United States Patent Office 2,954,084
Patented Sept. 27, 1960

2,954,084
APPARATUS FOR UNEARTHING TREE ROOTS

Walter A. Swertfeger, Keyport, N.J., assignor to Root-Removal Corporation, a corporation of New Jersey Filed Mar. 10, 1958, Ser. No. 720,426

9 Claims. (Cl. 171—10)

This invention relates to apparatus for extracting tree roots and the like from cleared ground and, more particularly, to a tractor-drawn device in which a rotatable cylinder adapted to roll over the ground is equipped with a plurality of projecting hooks which penetrate into the ground as the cylinder rolls to grasp the buried roots and draw them from the ground. The apparatus includes a combing device adapted to remove the excavated roots from the hooks.

When wooded land is developed for building, farming, or other purposes, many of the trees and bushes must be cleared away and their stumps and roots removed. Generally the larger trees are felled and their stumps blased, burned, or cut out individually, while the bushes and smaller trees are simply removed by a bulldozer. Since many roots and some stumps are left in the ground after the land is cleared in this manner, it is often desirable to extract those that remain if at all possible. This can be done, for example, by excavating the buried roots with a bulldozer and removing along with them a great deal of earth or, alternatively, by removing the roots individually. When the former course is taken, the extracted roots and stumps are mixed with and covered by great quantities of loose earth. As a result, they are not only difficult to collect but also, because of the heavy clods of earth clinging to them, are often impossible to burn. The alternative of removing the roots individually is very laborious and often is impractical.

It is a major purpose of the present invention to provide a device especially designed to extract buried tree roots, stumps and the like remaining in cleared ground without displacing great quantities of earth along with them. By means of the apparatus provided by this invention the roots are withdrawn relatively cleanly from the ground in such a manner that they are practically free of heavy clods of earth. They are deposited on the surface of the ground after being extracted by the apparatus and can easily be collected for disposal. Roots extracted by the apparatus of this invention can be burned without difficulty since there is very little earth clinging to them.

The new root-unearthing device is of simple design and, though rugged and heavy, is readily adapted to be transported from one site to another. It may be employed in combination with a suitable tractor having a land-clearing blade attached in front, preferably of the V-shaped design commonly used when clearing land to push aside small trees and bushes, rather than the straight blade design employed in earth-moving. When the apparatus is used in combination with a tractor in this manner, the growth may be cleared and the buried tree roots and small stumps extracted from the ground in one operation.

The new apparatus comprises a frame adapted to be drawn by the tractor, and a hollow weighted cylinder rotatably mounted in the frame and adapted to roll on the ground as the frame is drawn. Affixed to and projecting substantially radially from the cylindrical portion of the cylinder are a plurality of hooks arranged in several circular circumferential rows and in several helical longitudinal rows of long pitch. These hooks are curved substantially in the direction of rotation of the cylinder as the frame is drawn forwardly, and are adapted to penetrate the ground as the cylinder rolls to grasp the roots and extract them from the ground.

Also mounted on the frame is a combing device for removing the roots from the hooks. This combing device includes several downwardly extending parallel teeth which are urged toward the cylinder between respective parallel rows of hooks by associated spring means. The teeth are tapered and have root-displacing edges which define included angles with respect to the concavely curved sides of the hooks such that any roots or other debris on the hooks are displaced radially outwardly off the hooks as rotation of the cylinder carries said hooks past the root-displacing edges. In order to permit the apparatus to be transported with the cylinder and hooks suspended above the ground, a detachable wheeled undercarriage is provided in combination with it.

The combing device is designed especially for displacing unearthed roots from the hooks. As the cylinder rolls over the ground and the successive rows of hooks penetrate the ground and extract the roots, the extracted roots are likely to be caught on the hooks and carried upwardly on the rearward side of the cylinder, and they would be carried around to be crushed by the cylinder and foul it if it were not for the combing device. Since the extracted roots must ordinarily be disposed of, it is undesirable to have them broken into small pieces because they cannot then be easily collected for burning. The contemplated combing device, therefore, displaces the extracted roots radially off the hooks without breaking them as the hooks move upwardly immediately after emerging from the ground, and the roots fall free on the surface of the ground behind the apparatus, where they can be readily picked up.

A preferred embodiment of the invention is described hereinbelow with reference to the accompanying drawings, wherein Fig. 1 is a plan view of the root-extracting apparatus drawn by a tractor having a V-type blade;

Fig. 2 is an enlarged vertical section of the apparatus partly broken away and taken substantially along the line 2—2 of Fig. 1;

Fig. 3 is a section taken through the cylinder along the line 3—3 of Fig. 2;

Fig. 4 is an enlarged detailed section illustrating one manner in which the hooks may be affixed to the cylinder;

Fig. 5 is a side elevation of the rearward part of the apparatus frame, showing the cylinder and the combing device;

Fig. 6 is a perspective view of the apparatus suspended above the ground to be removably attached to the wheeled undercarriage; and Fig. 7 is a perspective view of the rear of the apparatus as it is suspended above the ground showing the wheeled undercarriage about to be attached.

As seen in Fig. 1, a conventional tractor 10 is equipped with a V-type blade 11 in such a manner that any shrubs and small trees encountered by the tractor as it travels over the land to be cleared may be toppled over by the blade. Stumps and roots which remain in the ground are extracted by the apparatus pulled along behind the tractor. A heavy tractor running on endless tracks 12 is preferred since it must perform this dual function of dragging the heavy root-extracting apparatus and felling the trees with the blade.

The root-extracting apparatus pulled by the tractor includes a rigid welded frame constructed of a substantially U-shaped yoke having a base portion 15 and side members 16 and 16'. The base portion 15 is of two pieces bolted together at 15'. The frame also includes upright portions 17 and 17' affixed respectively to side arms 16 and 16' near their rearward ends. The side arms 16 and 16' of the yoke are of rigid welded box construction open at their rearward ends. A drawbar 18 is removably but rigidly attached to the base portion 15 of the U-shaped yoke of the frame and is adapted to be removably pivotally attached at the other end to the rear of the tractor 10. As seen in Fig. 6, the draw-bar 18 is of arched construction to prevent it from interfering with the rearward portions of the endless tracks 12 when the tractor 10 is backed and turned sharply.

The rearwardly extending side arms 16 and 16' of the U-shaped yoke of the frame are each rectangular in cross-section and carry journal bearings 19 and 19' mounted near their rearward extremities. Each bearing is constructed of outer and inner bushings 20 and 21 respectively, separated by a snugly fitting rubber sleeve 22 which provides some freedom of movement for the inner bushing and permits the bearings to be aligned coaxially even though slight dimensional inaccuracies may exist in the welded frame. The bushings and sleeve of each bearing are substantially coextensive and extend horizontally between circular openings in the inner and outer walls of each rectangular side arm 16 and 16' of the yoke portion. A thrust plate 23 covers the opening in the outer wall and the outer end of the bearing, and an annular plate 24 encircles the opening in the inner wall to hold the bearing in position. Each bearing may be lubricated by means of an oil-fitting 25, accessible through the open rearward ends of the side arms 16 and 16'.

The inner bushing 21 of the journal bearings 19 and 19' rotatably accommodate a pair of heavy shaft pins 26 and 26' respectively which are affixed to and extend axially from the ends of a large hollow cylinder 27. Thus, the cylinder 27 is rotatably mounted between the ends of the rearwardly extending side arms 16 and 16' of the yoke of the frame so it may roll over the surface of the ground behind the tractor 10.

The cylinder 27 includes an outer cylindrical member 28 closed at both ends by welded circular end plates 29 and 29' respectively, each of which has a central circular aperture through which the respective shaft pins 26 and 26' project. Within the cylinder, the end portion of each pin fits snugly into and is welded to a heavy-walled tube 30 extending the length of the cylinder between the end plates 29 and 29'. Annular supporting plates 31 are welded to the end plates around the circular shaft pin apertures to hold the ends of the tube 30 in position and to provide additional support for the pins 26.

Since for reasons given hereinbelow it is desirable to weight the cylinder by filling it with water, all seams and joints in the welded cylinder structure are made watertight. It will be noted in this regard that the cylinder is a hollow structure, completely enclosed except for holes closed by removable threaded plugs 32 and 33 in each end plate near the periphery of the cylinder, through which water may be introduced or drained.

Several circumferential circular straps 35 are welded around the periphery of the cylindrical member 28 of the cylinder 27 to strengthen it and to provide a firm foundation for a plurality of root-extracting hooks 36 which are affixed to and project substantially radially from the cylindrical member 28. In Fig. 4 the base of one of these hooks 36, which may be of cast steel, is shown in more detail. It includes a circular stem portion flanged at its lower end and formed with a groove which is adapted to straddle one of the straps 35. It is welded on each to the cylindrical member 28, and it also is welded to the reinforcing strap 35. The outer ends of the hooks 36, as seen most clearly in Figs. 3 and 5, are pointed and curved concavely in the direction of rotation of the cylinder as the tractor moves forwardly (i.e. as shown by the arrows in Fig. 1). The degree to which the ends of the hooks are curved advantageously is such that the hooks enter the ground substantially perpendicularly as the cylinder rolls along behind the tractor.

Since the hooks 36 are circumferentially positioned on each of the several straps 35, they are disposed on the cylinder in a plurality of spaced circumferential rows. In addition, they are also arranged to extend in substantially longitudinal rows having a long pitch helical cast such that each longitudinal row winds circumferentially about the cylinder through a distance just a little less than the circumferential spacing of the hooks in each circumferential row. Thus the hooks are arranged to penetrate the ground successively, with the result that the force required to push them into the ground is considerably less than it would be if all the hooks in each longitudinal row were parallel to the drum axis and so caused to penetrate the ground simultaneously. To insure that the hooks penetrate the ground substantially for their full length and that the cylindrical member 28 rides directly on the surface of the ground, the cylinder is weighted by being filled with water.

Referring now to Figs. 5, 6 and 7, a combing device 45 is pivotally mounted between the upper ends of the upright portions 17 and 17' of the frame. The combing device 45 is of welded construction and includes a horizontal box-beam cross-member 46 which extends the length of the cylinder 27. Pins 47 project from each end of the cross-member 46 into corresponding pivot bearings 48 located coaxial with one another in the upper ends of the upright portions 17 and 17' respectively. Affixed to and depending downwardly from the underside of the cross-member 46 along its length are several teeth 49 which are configured to rest substantially against the rearward portion of the cylinder 27. One such tooth 49 is disposed between each adjacent pair of circumferential rows of the hooks 36. Each of the teeth 49 has a substantially tapered rearward face 50 which serves as a root-displacing edge. These faces or edges 50 of the teeth define included angles with respect to the concavely curved sides of the hooks (such as the angle $a$ in Fig. 5) such that roots and other debris caught on the hooks are displaced radially outwardly off the hooks as rotation of the cylinder carries the hooks past the root-displacing edges or faces.

Spring means are associated with the combing device to urge the teeth 49 toward and against the cylinder between the rows of hooks 36. As seen in Figs. 5 and 7, two of these spring means preferably are employed, one on each side of the apparatus, and each includes a rigid arm 55 extending rearwardly from the cross-member 46 of the combing device. A hole at the end of the arm 55 loosely accommodates a rod 56 which extends downwardly therethrough and is pivotally attached at its lower end to a rigid bracket 57 which projects rearwardly from the lower portion of the upright portion of the frame. On the upper end of the rod 56, a washer 58 is secured by a nut 59 to hold a spring 60 around the rod 56 and under compression against the upper surface of the arm 55. Thus the springs 60 exert a turning force on the combing device 45 (in a clockwise direction as seen in Fig. 5) and thus urge the teeth 49 against the cylinder between the rows of hooks 36. As a result of this resilient mounting, it is possible for the teeth to be lifted away from the cylinder, against the compressive force of the springs 60, should a root get wedged between one of the teeth and the cylinder. Such root is thus prevented from jamming so tightly against the cylinder as to prevent operation of the device.

Since the hooks 36 are rigidly affixed and are adapted to penetrate the ground whenever the cylinder 26 rolls along upon the ground, a wheeled carriage 65 (illustrated in Fig. 7) is included in the combination to permit the apparatus to be transported from one working site to another over the highway, with the hooks suspended off the ground. The wheeled carriage includes a truck axle supported by wheels and surmounted by a welded frame 66. Two beams 67 and 67' extend forwardly from the welded frame. At the outer end of the beams 67 and 67' are rectangular portions 68 and 68' respectively which are adapted to be fit snugly into the rectangular open rearward ends of the side arms 16 and 16' of the U-shaped yoke.

When the apparatus is to be transported on a highway, the frame is elevated by block and tackle gear as seen in Figs. 6 and 7, utilizing eye lugs 70 and 71 provided for this purpose at the upper ends of the upright frame portions 17 and 17'. With the apparatus thus elevated, the undercarriage 65 is rolled into position behind the apparatus and the rectangular portions 68 and 68' of the beams 67 and 67' are inserted into the open ends of the U-shaped yoke of the frame. The carriage and frame are thus telescoped together so that the cylinder is supported off the ground. To prevent the wheeled carriage 65 from slipping out of the frame 15, a cable 69 (see Fig. 7) extends from the wheeled carriage forwardly to the base portion 15 of the U-shaped yoke. The apparatus may be raised on conventional ratchet jacks if desired, rather than by the structure shown.

Several measures advantageously are taken to lessen the load of the cylinder on its shaft pins 26 and bearings when the apparatus is supported on the wheeled carriage 65. First, the water is drained from the cylinder to lessen its weight. Then, another cable 72 is passed beneath the cylinder from an eye 73 located at the center of the cross-member 46 of the combing device (see Fig. 7) to turnbuckles 74 linked to the draw-bar 18. When the turnbuckles are tightened, the cable 72 lifts upwardly beneath the cylinder 27 and assists the pins 26 to support the weight of the cylinder.

In operation of the apparatus described above, the cylinder is filled with water and the draw-bar 18 is affixed to the tractor 10. The tractor is then driven over the land to be cleared, pushing over the shrubs and small trees with the blade 11. Rolling behind the tractor 10 on the surface of the ground is the cylinder 27, with its hooks 36 being forced into the ground and then raised to extract the buried roots as the cylinder advances. The point of each hook describes a substantially cycloidal path such that there is substantial rearward motion of the hook under the ground at their greatest depth of penetration, even though the apparatus is moving forwardly. Roots or like matter in the ground are thereby caught by the hooks and are drawn upwardly out of the ground to the rear of the cylinder, as schematically illustrated in Fig. 5. As the circular rows of hooks pass between the teeth 49 of the combing device, the teeth engage the roots where they extend laterally beyond the hooks, and displace them outwardly off the ends of the hooks onto the ground at the rear of the apparatus. The tapered edge or face 50 of the teeth 49 is so configured that the included angle between such edge or face and the curved side of the hook on either side of it is sufficiently large (preferably over 15°) at substantially all positions of the tooth relative to the hook to insure pushing the roots rearwardly off the hooks, and prevent shearing action between the teeth and hooks which would consume power and cause the roots to be broken in small pieces.

In the event that the apparatus is to be pushed in reverse by the tractor 10, the spring means associated with the combing device 45 permits any roots caught on the convex side of the hooks to pass under the teeth of the combing device. When this occurs, the entire combing device pivots about the pins 47 into the position shown by the dash-dot lines in Fig. 5, against the force of the springs 60, thereby permitting the roots to pass through the combing device without jamming in the teeth 49 and fouling operation of the apparatus. The springs 60 return the comb teeth to normal operative position between the rows of hooks after such roots have passed through.

I claim:

1. Apparatus for extracting buried tree roots and the like from cleared ground comprising a frame adapted to be driven by tractor means, a cylinder rotatably mounted in said frame and adapted to roll on the ground as said frame is drawn, a plurality of substantially radial hooks projecting from the circumference of said cylinder in a plurality of circumferential rows and in a plurality of substantially longitudinal rows, said longitudinal rows extending helically with such a long pitch that the wind thereof about the cylinder is less than the spacing of the hooks in each circumferential row, said hooks being curved concavely in the direction of rotation of said cylinder as said frame is drawn forwardly, said hooks being adapted to penetrate the ground as said cylinder rolls to grasp buried tree roots and extract them from the ground, and a rigid unitary non-rotatable combing device for removing roots and other debris from said hooks pivotally mounted on an axis parallel to the axis of rotation of the cylinder, said combing device including teeth adapted to lie adjacent said cylinder, said teeth extending integrally from the unitary combing device of which they are a part and being rigid with respect to one another, said teeth being tapered and having root-displacing edges defining included angles with respect to the concavely curved sides of said hooks when viewed in side elevation such that roots and other debris caught on the hooks are displaced radially outwardly off the hooks as rotation of the cylinder carries said hooks past said root-displacing edges.

2. Apparatus for extracting buried tree roots and the like from cleared ground comprising a frame adapted to be driven by tractor means, a cylinder rotatably mounted in said frame and adapted to roll on the ground as said frame is drawn, a plurality of substantially radial hooks projecting from the circumference of said cylinder, said hooks being arranged in several circular circumferential rows and in several helical longitudinal rows of long pitch, said hooks being curved concavely in the direction of rotation of said cylinder as said frame is drawn forwardly, said hooks being adapted to penetrate the ground as said cylinder rolls to grasp buried tree roots and extract them from the ground, the long pitch and distance between the several helical longitudinal rows being such that the hooks are adapted to penetrate the ground successively, and a non-rotatable rigid unitary combing device for removing roots and other debris from said hooks, said combing device including teeth adapted to lie adjacent said cylinder, said teeth extending integrally from the unitary combing device of which they are a part and being rigid with respect to one another, said teeth being tapered and having root-displacing edges defining included angles with respect to the concavely curved sides of said hooks when viewed in side elevation such that roots and other debris caught on the hooks are displaced radially outwardly off the hooks as rotation of the cylinder carries said hooks past said root-displacing edges.

3. Apparatus for extracting buried tree roots and the like from cleared ground comprising a frame adapted to be drawn by tractor means, a weighted cylinder rotatably mounted in said frame and adapted to roll on the ground as said frame is drawn, a plurality of hooks affixed to and projecting substantially radially from the cylindrical portion of said cylinder in several circular circumferential rows and in several helical longitudinal rows of such long pitch that the wind of each longitudinal row about the cylinder is less than the spacing of the hooks in each circumferential row, said hooks being curved concavely in the direction of rotation of said cylinder as said frame is drawn forwardly, said hooks being adapted to penetrate the ground as said cylinder rolls and to grasp buried roots and extract them from the ground, and a non-rotatable rigid unitary combing device mounted on said frame for removing roots and other debris from said hooks, said combing device including teeth adapted to lie adjacent said cylinder between respective circumferential rows of hooks, said teeth extending integrally from the unitary combing device of which they are a part and being rigid with respect to one another, said teeth being tapered and having root-displacing edges defining included angles with respect to the concavely curved sides of the hooks when viewed in side elevation such that roots and other debris caught on the hooks are displaced radially outwardly off the hooks as rotation of the cylinder carries said hooks past said root-displacing edges.

4. Apparatus for extracting buried tree roots and the like from cleared ground comprising a frame adapted to be drawn by tractor means, a hollow weighted cylinder rotatably mounted in said frame and adapted to roll on the ground as said frame is drawn, a plurality of hooks affixed to and projecting substantially radially from the cylindrical portion of said cylinder, said hooks being arranged in several circular circumferential rows and in several helical longitudinal rows of such long pitch that the wind of each longitudinal row about the cylinder is less than the spacing of the hooks in each circumferential row, said hooks being curved concavely in the direction of rotation of said cylinder as said frame is drawn forwardly, said hooks being adapted to penetrate the ground as said cylinder rolls and to grasp buried roots and extract them from the ground, and a non-rotatable rigid unitary combing device pivotally mounted on said frame for removing roots and other debris from said hooks, said combing device including downwardly extending parallel teeth, said teeth extending integrally from the unitary combing device of which they are a part and being rigid with respect to one another, and spring means urging said teeth toward said cylinder between respective circumferential rows of hooks, said teeth being tapered and having root-displacing edges defining included angles with respect to the concavely curved sides of said hooks when viewed in side elevation such that roots and other debris caught on the hooks are displaced radially outwardly off the hooks as rotation of the cylinder carries said hooks past said root-displacing edges.

5. Apparatus for extracting buried tree roots and the like from cleared ground comprising a frame adapted to be drawn by tractor means, a hollow weighted cylinder rotatably mounted axially in said frame and adapted to roll on the ground as said frame is drawn, a plurality of pointed hooks affixed to and projecting substantially radially from the cylindrical portion of said cylinder, said hooks being arranged in several circular circumferential rows and in several helical longitudinal rows of such long pitch that the wind of each longitudinal row about the cylinder is less than the spacing of the hooks in each circumferential row, said hooks being curved concavely in the direction of rotation of said cylinder as said frame is drawn forwardly and being adapted to penetrate the ground as said cylinder rolls and to grasp buried roots and extract them from the ground, and a non-rotatable rigid unitary combing device pivotally mounted on said frame above said cylinder for removing roots and other debris from said hooks, said combing device including downwardly extending parallel teeth, said teeth extending integrally from the unitary combing device of which they are a part and being rigid with respect to one another, and spring means positioned between and acting against abutments on both said combing device and said frame to pivotally urged the teeth of said combing device toward said cylinder between circumferential rows of hooks on the rearward side thereof, said teeth being tapered and having rearwardly facing root-displacing edges defining included angles with respect to the concavely curved sides of said hooks when viewed in side elevation such that roots and other debris caught on the hooks are displaced radially outwardly off the hooks as rotation of the cylinder carries said hooks past said root-displacing edges.

6. Apparatus for extracting buried tree roots and the like from cleared ground comprising a frame structure adapted to be drawn by tractor means, a hollow cylinder rotatably mounted axially in said frame structure and adapted to roll on the ground as said frame structure is drawn by said tractor means, said hollow cylinder being adapted to be filled with water and sealed to increase its weight, a plurality of pointed hooks affixed to and projecting substantially radially from the cylindrical portion of said cylinder, said hooks being arranged on said cylinder in several circular circumferential rows and in several helical longitudinal rows of long pitch, said hooks being curved concavely in the direction of rotation of said cylinder as said frame structure is drawn forwardly and being adapted to penetrate the ground as said cylinder rolls and to grasp buried roots and extract them from the ground, the long pitch and distance between the several helical longitudinal rows being such that the hooks are adapted to penetrate the ground successively, and a rigid unitary combing device pivotally mounted on said frame structure above said cylinder for removing roots and other debris from said hooks, said combing device including rigid downwardly extending parallel teeth corresponding in number and spacing to the spaces between the circular circumferential rows of hooks on said cylinder, said teeth extending integrally from the unitary combing device of which they are a part and being rigid with respect to one another, spring means positioned between and acting against abutments on both said combing device and said frame structure to pivotally urge said teeth toward said cylinder between respective circumeferential rows of hooks on the rearward side of said cylinder, said teeth being tapered and having rearwardly facing root-displacing edges defining included angles with respect to the concavely curved sides of said hooks when viewed in side elevation such that any roots and other debris caught on the hooks are displaced radially outwardly off the hooks as rotation of the cylinder carries said hooks past said root-displacing edges.

7. In combination with tractor means having a land-clearing blade attached in front, apparatus for extracting buried tree roots and the like from the ground comprising a frame drawn by said tractor, a weighted cylinder rotatably mounted in said frame and rolling on the ground as said frame is drawn, a plurality of hooks affixed to and projecting substantially radially from the cylindrical portion of said cylinder in several circular circumferential rows and in several helical longitudinal rows of such long pitch that the wind of each longitudinal row about the cylinder is less than the spacing of the hooks in each circumferential row, said hooks being curved substantially in the direction of rotation of said cylinder as said frame is drawn forwardly and being adapted to penetrate the ground as said cylinder rolls and to grasp buried roots and extract them from the ground, and a non-rotatable rigid unitary combing device mounted on said frame for removing roots and other debris from said hooks, said combing device including teeth disposed adjacent said cylinder between respective circumferential rows of hooks, said teeth extending integrally from the unitary combing device of which they are a part and being rigid with respect to one another, said teeth being tapered and having root-displacing edges defining included angles with respect to the concavely curved sides of said hooks when viewed in side elevation such that roots and other debris caught on the hooks are displaced radially outwardly off the hooks as rotation of the cylinder carries said hooks past said root-displacing edges.

8. In combination with a tractor having a V-shaped blade attached in front for clearing land, apparatus for extracting buried tree roots and the like from the ground comprising a frame drawn by said tractor, a weighted cylinder rotatably mounted in said frame and rolling on the ground as said frame is drawn, a plurality of hooks affixed to and projecting substantially radially from the cylindrical portion of said cylinder in several circular circumferential rows and in several helical longitudinal rows of such long pitch that the wind of each longitudinal row about the cylinder is less than the spacing of the hooks in each circumferential row, said hooks being curved substantially in the direction of rotation of said cylinder as said frame is drawn forwardly and being adapted to penetrate the ground as said cylinder rolls and to grasp buried roots and extract them from the ground, and a non-rotatable rigid unitary combing device mounted on said frame for removing roots and other debris from said hooks, said combing device including teeth disposed adjacent said cylinder between respective circumferential rows of hooks, said teeth extending integrally from the unitary combing device of which they are a part and being rigid with respect to one another, said teeth being tapered and having root-displacing edges defining included angles with respect to the concavely curved sides of said hooks when viewed in side elevation such that roots and other debris caught on the hooks are displaced radially outwardly off the hooks as rotation of the cylinder carries said hooks past said root-displacing edges.

9. Apparatus for extracting buried tree roots and the like from wooded ground comprising a frame adapted to be drawn by tractor means, a weighted cylinder rotatably mounted in said frame and adapted to roll on the ground as said frame is drawn, a plurality of hooks affixed to and projecting substantially radially from the cylindrical portion of said cylinder in several circular circumferential rows and in several helical longitudinal rows of such long pitch that the wind of each longitudinal row about the cylinder is less than the spacing of the hooks in each circumferential row, said hooks being curved substantially in the direction of rotation of said cylinder as said frame is drawn forwardly and being adapted to penetrate the ground as said cylinder rolls and to grasp buried roots and extract them from the ground, a non-rotatable rigid unitary combing device mounted on said frame for removing roots and other debris from said hooks, said combing device including teeth disposed adjacent said cylinder between respective circumferential rows of hooks, said teeth extending integrally from the unitary combing device of which they are a part and being rigid with respect to one another, said teeth being tapered and having root-displacing edges defining included angles with respect to the concavely curved sides of said hooks when viewed in side elevation such that roots and other debris caught on the hooks are displaced radially outwardly off the hooks by the root-displacing edges as the cylinder rolls on the ground, and a wheeled undercarriage adapted to be removably attached to said frame and to support it when attached so that said cylinder and hooks are suspended above the ground, thereby to permit said apparatus to travel on a highway.

References Cited in the file of this patent

UNITED STATES PATENTS

| | | |
|---|---|---|
| 38,109 | Hewit | Apr. 7, 1863 |
| 157,827 | Hoover | Dec. 15, 1874 |
| 286,961 | Raymond | Oct. 16, 1883 |
| 704,897 | May | July 15, 1902 |
| 1,022,896 | Stevens | Apr. 9, 1912 |
| 1,027,125 | Guidinger | May 21, 1912 |
| 1,066,811 | Harrison | July 8, 1913 |
| 1,407,407 | Gravert | Feb. 21, 1922 |
| 1,415,759 | Allen | May 9, 1922 |
| 2,230,704 | Sorensen | Feb. 4, 1941 |
| 2,509,463 | Wade | May 30, 1950 |

FOREIGN PATENTS

| | | |
|---|---|---|
| 2,354 | Great Britain | 1861 |